(12) United States Patent
Johnson et al.

(10) Patent No.: US 10,198,706 B2
(45) Date of Patent: Feb. 5, 2019

(54) OPERATOR IDENTIFICATION AND PERFORMANCE TRACKING

(71) Applicant: Locus Robotics Corp., Wilmington, MA (US)

(72) Inventors: Michael Charles Johnson, Ashland, MA (US); Bradley Powers, Lowell, MA (US); Bruce Welty, Boston, MA (US); Sean Johnson, Danvers, MA (US)

(73) Assignee: Locus Robotics Corp., Wilmington, MA (US)

( * ) Notice: Subject to any disclaimer, the term of this patent is extended or adjusted under 35 U.S.C. 154(b) by 740 days.

(21) Appl. No.: 14/815,110

(22) Filed: Jul. 31, 2015

(65) Prior Publication Data
US 2017/0032306 A1  Feb. 2, 2017

(51) Int. Cl.
*G06F 19/00* (2018.01)
*G06Q 10/06* (2012.01)
(Continued)

(52) U.S. Cl.
CPC ..... *G06Q 10/06398* (2013.01); *B65G 1/1378* (2013.01); *G05B 19/042* (2013.01); *G05D 1/0022* (2013.01); *G05D 1/0234* (2013.01); *G05D 1/0261* (2013.01); *G06K 7/10297* (2013.01); *G06K 7/10366* (2013.01); *G06K 9/00288* (2013.01); *G06K 9/00597* (2013.01); *G06Q 10/087* (2013.01);
(Continued)

(58) Field of Classification Search
None
See application file for complete search history.

(56) References Cited

U.S. PATENT DOCUMENTS 5,956,465 A * 9/1999 Takagi ............. G05B 19/41815
                                                           700/178
6,778,092 B2 * 8/2004 Braune ................... F16P 3/144
                                                           250/221
(Continued)

FOREIGN PATENT DOCUMENTS

JP  2012048531 A  3/2012
WO  2006076283 A1  7/2006
(Continued)

OTHER PUBLICATIONS

International Search Report and Written Opinion, dated Aug. 1, 2016, received in international patent application No. PCT/US2016/044988, 10 pgs.

*Primary Examiner* — Bhavesh V Amin
(74) *Attorney, Agent, or Firm* — Verrill Dana, LLP; John W. Powell

(57) ABSTRACT

A system for identifying and tracking performance of operators in a warehouse. The system comprises at least one robot configured to interact with the operators in the warehouse. The at least one robot includes a first transceiver, a proximity detector, and a memory. The first transceiver defines a zone surrounding the robot and the proximity detector is coupled to the first transceiver. The proximity detector is configured to detect entry, into the zone, of an operator and to detect exit of the operator from the zone. The memory contains information identifying said operators who have entered and exited the zone.

25 Claims, 5 Drawing Sheets

(51) Int. Cl.
  *G06Q 10/10* (2012.01)
  *G06K 7/10* (2006.01)
  *G06K 9/00* (2006.01)
  *G06Q 50/28* (2012.01)
  *B65G 1/137* (2006.01)
  *G05B 19/042* (2006.01)
  *G05D 1/00* (2006.01)
  *G05D 1/02* (2006.01)
  *G06Q 30/06* (2012.01)
  *G06Q 10/08* (2012.01)

(52) U.S. Cl.
  CPC ..... *G06Q 10/1091* (2013.01); *G06Q 30/0635* (2013.01); *G06Q 50/28* (2013.01); *G05B 2219/39371* (2013.01); *G05D 2201/0216* (2013.01)

(56) References Cited

U.S. PATENT DOCUMENTS

| | | | |
|---|---|---|---|
| 7,031,801 B1 | 4/2006 | Hodge et al. | |
| 7,031,802 B2 | 4/2006 | Bash et al. | |
| 7,243,001 B2 | 7/2007 | Janert et al. | |
| 7,607,440 B2* | 10/2009 | Coste-Maniere | B25J 9/1671 128/898 |
| 7,623,031 B2* | 11/2009 | Haberer | F16P 3/144 340/540 |
| 7,652,238 B2* | 1/2010 | Haberer | F16P 3/147 250/206.1 |
| 7,778,732 B2* | 8/2010 | Adachi | B25J 9/0003 318/568.12 |
| 8,055,377 B2 | 11/2011 | Yair et al. | |
| 8,315,735 B2* | 11/2012 | Nihei | B25J 9/1676 318/568.11 |
| 8,571,915 B1 | 10/2013 | Wong et al. | |
| 8,839,132 B2 | 9/2014 | Reichert | |
| 9,043,025 B2* | 5/2015 | Brooks | B25J 9/1676 700/245 |
| 9,126,334 B2* | 9/2015 | Nakamura | B25J 9/1676 |
| 9,333,652 B2* | 5/2016 | Hu | G06K 9/00355 |
| 9,393,695 B2* | 7/2016 | Scott | B25J 9/1694 |
| 9,452,531 B2* | 9/2016 | Kikkeri | B25J 9/1676 |
| 9,463,927 B1 | 10/2016 | Theobald | |
| 9,475,200 B2* | 10/2016 | Schlaich | B25J 9/1676 |
| 9,489,730 B2* | 11/2016 | Doettling | F16P 3/142 |
| 9,498,885 B2* | 11/2016 | Scott | B25J 9/1694 |
| 2002/0186299 A1* | 12/2002 | Cofer | F16P 3/142 348/152 |
| 2003/0109780 A1* | 6/2003 | Coste-Maniere | B25J 9/1671 600/407 |
| 2004/0148039 A1* | 7/2004 | Farchmin | G05B 19/122 700/79 |
| 2005/0207618 A1* | 9/2005 | Wohler | B25J 9/1674 382/103 |
| 2006/0049939 A1* | 3/2006 | Haberer | F16P 3/142 340/541 |
| 2008/0021597 A1* | 1/2008 | Merte | F16P 3/141 700/255 |
| 2009/0015663 A1* | 1/2009 | Doettling | F16P 3/14 348/46 |
| 2009/0177323 A1* | 7/2009 | Ziegler | B25J 5/007 700/259 |
| 2009/0222134 A1* | 9/2009 | Franke | G05B 19/4061 700/251 |
| 2009/0237499 A1* | 9/2009 | Kressel | G06K 9/00201 348/77 |
| 2009/0271036 A1* | 10/2009 | Kock | B25J 9/1666 700/245 |
| 2010/0179690 A1* | 7/2010 | Matthias | B25J 9/1676 700/253 |
| 2010/0198365 A1* | 8/2010 | Kawabata | G01S 7/4812 700/12 |
| 2010/0296908 A1 | 11/2010 | Ko | |
| 2011/0200420 A1 | 8/2011 | Driskill | |
| 2011/0264266 A1* | 10/2011 | Kock | B25J 9/1676 700/253 |
| 2011/0276396 A1* | 11/2011 | Rathod | G06F 17/30867 705/14.49 |
| 2012/0022689 A1* | 1/2012 | Kapoor | B25J 9/1666 700/255 |
| 2012/0041593 A1* | 2/2012 | Ichinose | B66B 1/2458 700/258 |
| 2012/0146789 A1* | 6/2012 | De Luca | G08B 21/12 340/540 |
| 2012/0303160 A1* | 11/2012 | Ziegler | B25J 5/007 700/259 |
| 2012/0330458 A1 | 12/2012 | Weiss | |
| 2013/0317642 A1 | 11/2013 | Asaria et al. | |
| 2014/0067121 A1* | 3/2014 | Brooks | B25J 9/1676 700/255 |
| 2014/0107833 A1 | 4/2014 | Segawa et al. | |
| 2014/0254896 A1 | 9/2014 | Zhou | |
| 2014/0263227 A1* | 9/2014 | Daniel | B23K 9/0956 219/130.01 |
| 2014/0277691 A1 | 9/2014 | Jacobus | |
| 2014/0309782 A1* | 10/2014 | Sharpe | G05D 21/02 700/266 |
| 2015/0025549 A1* | 1/2015 | Kilroy | A61B 90/60 606/130 |
| 2015/0049911 A1* | 2/2015 | Doettling | F16P 3/142 382/103 |
| 2015/0275551 A1* | 10/2015 | Rink | F16P 3/08 70/263 |
| 2015/0338917 A1* | 11/2015 | Steiner | H04L 9/3231 345/156 |
| 2016/0311115 A1* | 10/2016 | Hill | G06T 7/73 |
| 2017/0032306 A1* | 2/2017 | Johnson | G06Q 10/06398 |
| 2017/0049517 A1* | 2/2017 | Felder | A61B 34/37 |

FOREIGN PATENT DOCUMENTS

| | | |
|---|---|---|
| WO | 20080013846 A2 | 1/2008 |
| WO | 2008074008 A2 | 6/2008 |

\* cited by examiner

OPERATOR IDENTIFICATION AND PERFORMANCE TRACKING

RELATED APPLICATIONS

This application is related to U.S. patent application Ser. No. 14/815,246, titled "Robotic Navigation Utilizing Semantic Mapping", filed concurrently with this application, incorporated herein by reference.

FIELD OF INVENTION

This invention relates to operator identification and performance tracking in connection with robot-assisted warehouse storage and retrieval systems, in particular, to robot-assisted product order-fulfillment systems.

BACKGROUND

Ordering products over the Internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

Robot assisted order-fulfillment systems have been used to increase efficiency and productivity. However, there is still a need to further increase efficiency in such systems.

SUMMARY

In one aspect, the invention features a system for identifying and tracking performance of operators in a warehouse. The system includes at least one robot configured to interact with the operators in the warehouse, and the robot includes a first transceiver a proximity detector and a memory. The first transceiver defines a zone surrounding the robot and the proximity detector is coupled to said first transceiver. The proximity detector is configured to detect entry, into the zone, of an operator and to detect exit of the operator from the zone. The memory contains information identifying the operators who have entered and exited said zone.

In other aspects of the invention, one or more of the following features may be included. The system may further include a second transceiver associated with each operator that carries information identifying the operators and the second transceivers may be with the operators. The second transceiver may comprise an RFID transceiver. The at least one robot may further comprise a contactless identification system, wherein the contactless identification system identifies the local operator without physically contacting said local operator. The identification system may comprise a camera, and a facial-recognition system coupled to the camera, wherein the facial-recognition system identifies the local operator. The identification system may comprise a retinal scanner and a retinal-identification system coupled to the retinal scanner, wherein the retinal-identification system may identify the local operator. The at least one robot may further include a tablet, wherein the tablet may comprise a tablet processor and a network interface. Using the network interface, the tablet may provide information to a management server; the information may comprise information indicative of local operator activity. The information indicative of local operator activity may include information regarding one or more of the amount of time for an operator to enter the zone after the robot arrives at a destination proximate the user, the amount of time the operator takes to exit the zone after the operator enters the zone, or the amount of time the operator takes to perform a defined function.

In further aspects of the invention, one or more of the following features may be included. The management server may be configured to track local-operator efficiency based at least in part on the information indicative of local operator activity. The management server may be configured to provide to the local operator an incentive that is based at least in part on the information indicative of local operator activity. The management server may be configured to maintain warehouse statistics based at least in part on the information. The tablet may provide operator identification information to the management server. The operator identification information may be used by the management server to determine if the operator is an authorized operator. The operator identification information may be used by said management server to set operator preferences for interaction with said tablet; wherein said operator preferences include language.

In another aspect of the invention, there is method for identifying and tracking performance of operators in a warehouse. The method includes causing a robot to proceed to a location and at the location, defining a zone around the robot. The method includes detecting entry of a local operator into the zone and without physical contact with said local operator, identifying the local operator.

In yet other aspects of the invention, the following features may be included. The method may include detecting exit of the local operator from the zone. The method may include receiving, from a transceiver carried by the local operator, information identifying the local operator. The step of identifying the local operator may comprise receiving, from an RFID tag carried by the local operator, information identifying the local operator. The step of identifying the local operator may comprise performing identification based on data indicative of a face of the local operator. Identifying the local operator may comprise performing identification based on data indicative of a retina of said local operator. The method may further comprise providing information indicative of local operator activity to a management server. The information indicative of local operator activity may include information regarding one or more of the amount of time for an operator to enter the zone after the robot arrives at the location, the amount of time the operator takes to exit the zone after the operator enters the zone, or the amount of time the operator takes to perform a defined function. The method further comprises tracking local-operator efficiency based at least in part on the information indicative of local operator activity and providing, to a local operator, an incentive based at least in part on the information indicative of local operator activity. The method may further comprise maintaining warehouse statistics based at least in part on said information indicative of local operator activity. The method may also comprise providing operator identification information to the management server. The operator identification information may be used to determine if the operator is an authorized operator or it may be used to set operator preferences for interaction with the operator. The operator preferences may include language.

These and other features of the invention will be apparent from the following detailed description and the accompanying figures, in which:

DETAILED DESCRIPTION

Figure 1:
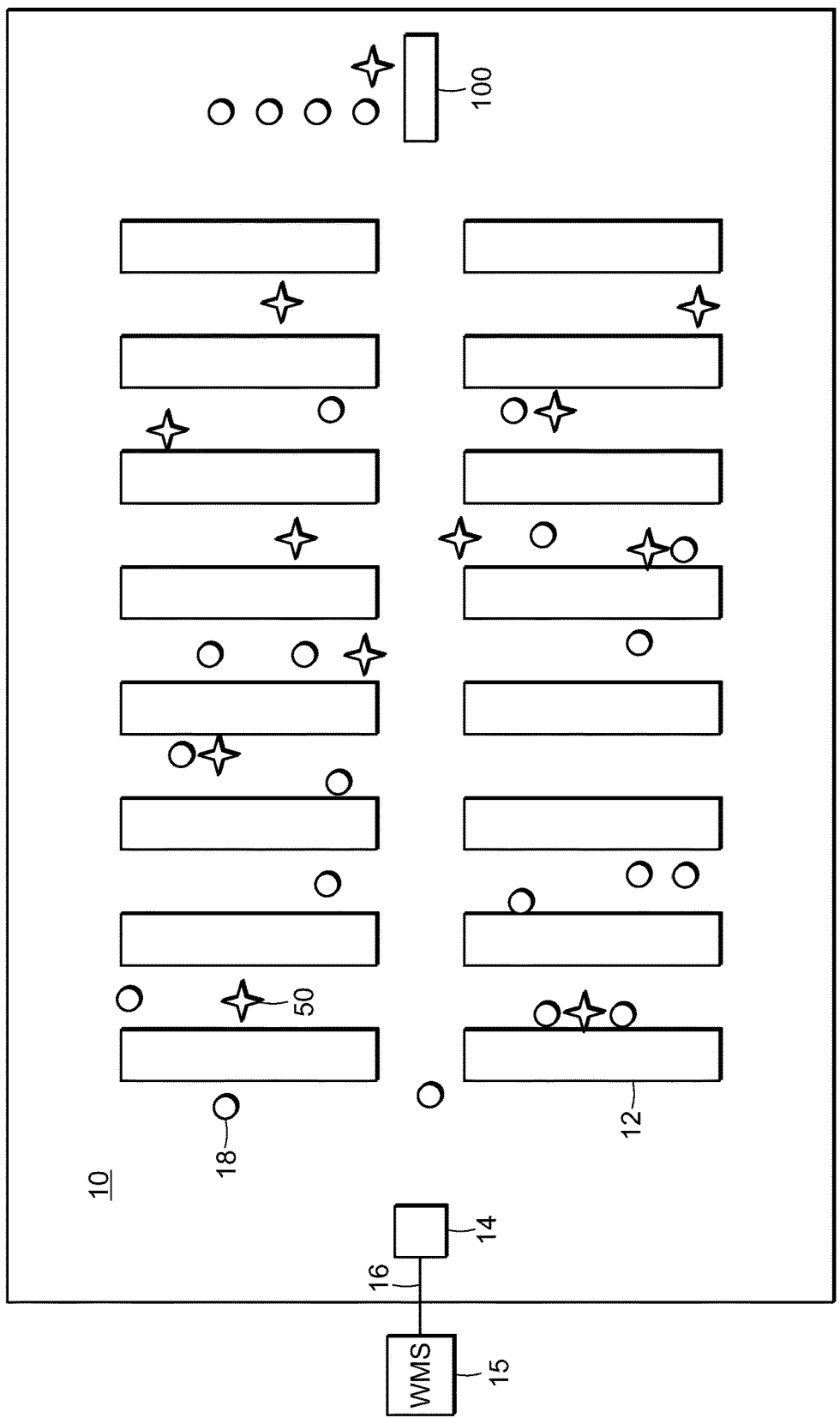
FIG. 1 is a plan view of a fulfillment warehouse.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10.

Figure 2:
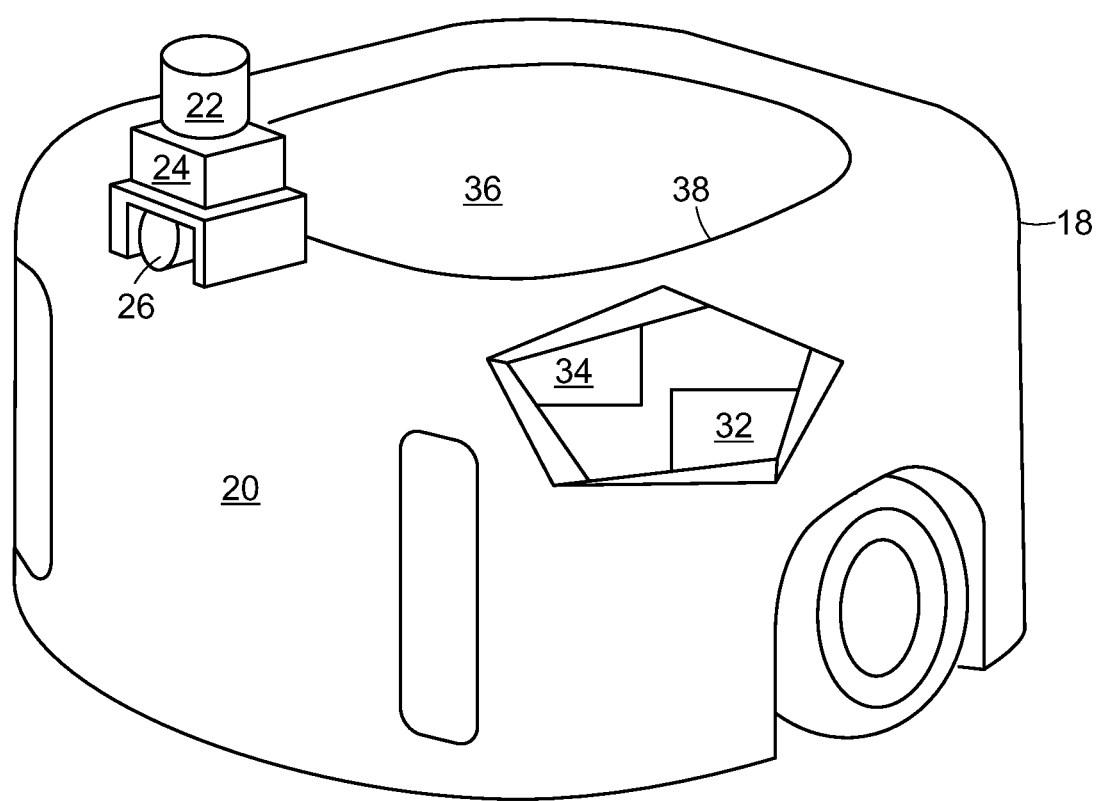
FIG. 2 shows a base of one of the robots used in the warehouse shown in FIG. 1.
Figure 3:
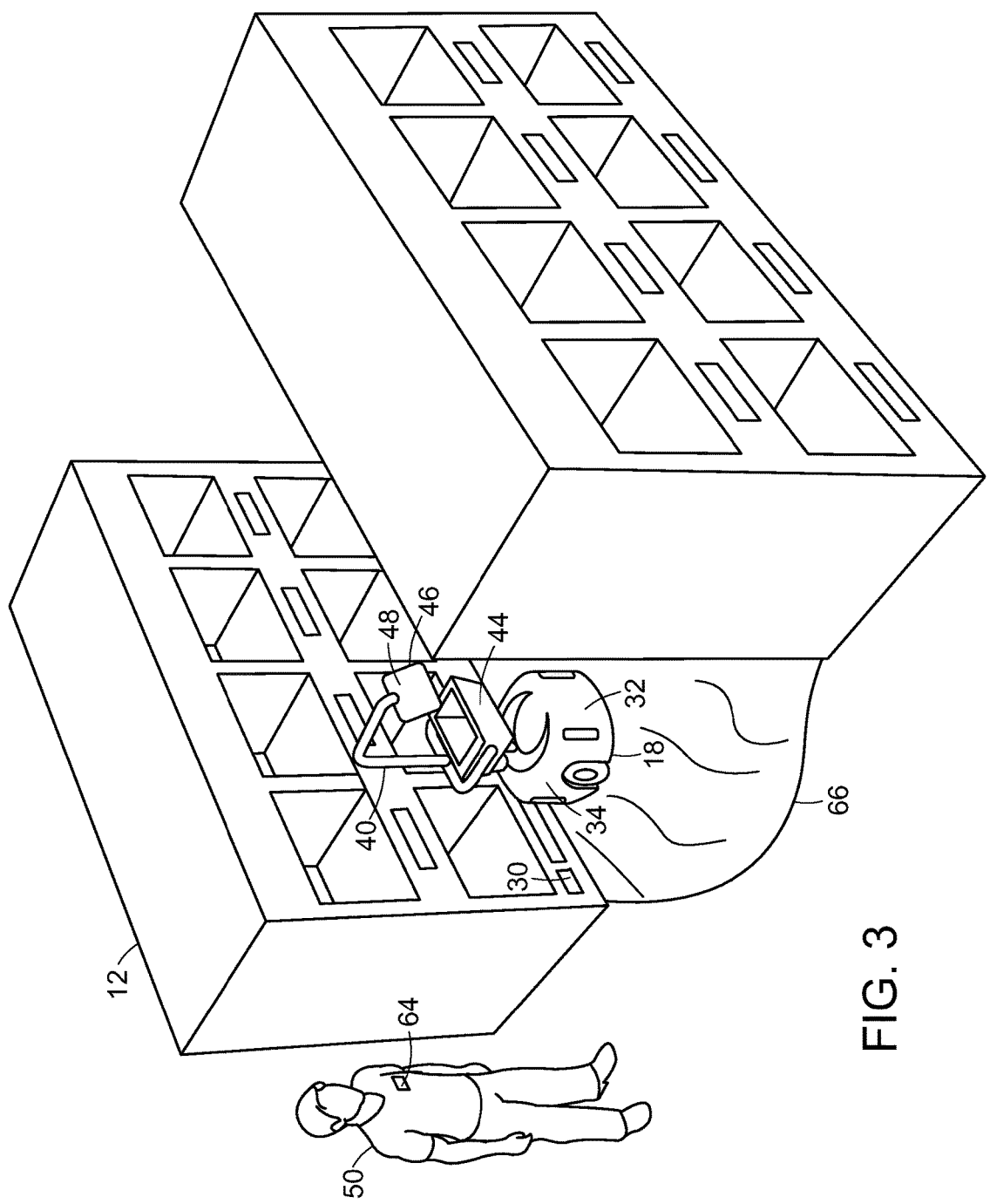
FIG. 3 is a perspective view showing the robot in FIG. 2 outfitted with an armature and parked in front of a shelf shown in FIG. 1.

A typical robot 18, shown in FIG. 2, includes an autonomous wheeled base 20 having a laser-radar 22. The base 20 also features a transceiver 24 that enables the robot 18 to receive instructions from the order-server 14, and a camera 26. The base 20 also features a processor 32 that receives data from the laser-radar 22 and the camera 26 to capture information representative of the robot's environment and a memory 34 that cooperate to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered.

While the description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention could also be utilized with other standard tasks associated with such a warehouse system, such as, consolidation of items, counting of items, verification, and inspection.

An upper surface 36 of the base 20 features a coupling 38 that engages any one of a plurality of interchangeable armatures 40, one of which is shown in FIG. 3. The particular armature 40 in FIG. 3 features a tote-holder 42 for carrying a tote 44 that receives items, and a tablet holder 46 for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them on the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48, which the local operator 50 can read, or by transmitting the order to a handheld device used by the local operator 50.

Upon receiving an order 16 from the order server 14, the robot 18 proceeds to a first warehouse location, e.g. shown in FIG. 3. It does so based on navigation software stored in the memory 34 and carried out by the processor 32. The navigation software relies on data concerning the environment, as collected by the laser-radar 22, an internal table in memory 34 that identifies the fiducial identification ("ID") of fiducial marker 30 that corresponds to a location in the warehouse 10 where a particular item can be found, and the camera 26 to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders. In addition, certain robots and operators may be performing a placing or storage task to stock the warehouse with items or other tasks such as consolidation of items, counting of items, verification, and inspection.

Figure 4:
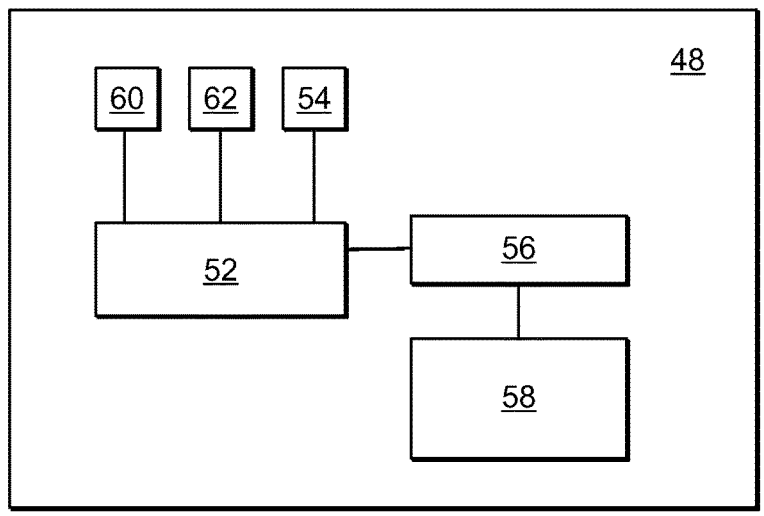
FIG. 4 shows the architecture of the tablet shown in FIG. 3.
Figure 5:
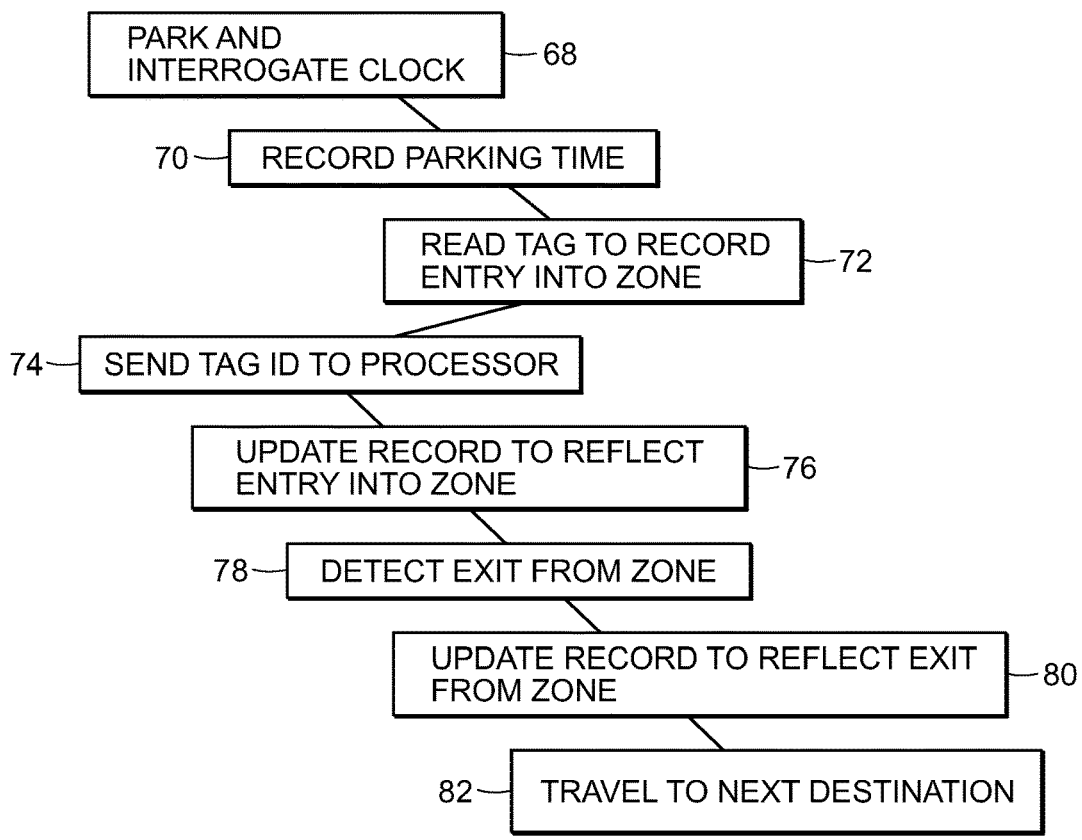
FIG. 5 is a flow-chart of a procedure executed by the tablet shown in FIG. 5.

Referring to FIGS. 4 and 5, a tablet-processor 52 then interrogates a tablet-clock 54 to determine the time at which robot 18 parked proximate fiducial 30 (step 68), and creates a record 56 in a tablet-memory 58 recording the its arrival at the shelf 12 (step 70). Alternatively, instead of interrogating a tablet-clock 54, the tablet-processor 52 may instead cause a tablet-timer 60 to start counting time. In either case, the goal is to determine how long the robot 18 is kept waiting.

The local operator 50 sees the robot 18 and walks towards it. The local operator 50 then inspects the tablet 48 to determine what item should be retrieved, retrieves the item from the shelf 12, and places it on robot 18, for example, into the tote 44.

In one embodiment, the tablet 18 has a proximity sensor 62 and the local operator 50 wears a tag 64 that can be sensed by the proximity sensor 62. As the local operator 50 walks into a zone 66, FIG. 3, surrounding the robot 18, the proximity sensor 62 reads the tag 64 worn by the local operator 50 (step 72). The proximity sensor 62 then communicates information concerning the tag 64 to the tablet-processor 52 (step 74). The size of zone 66 can vary depending on the particular application, but typically would be approximately one to two meters in diameter centered on the location of robot 18. The tablet-processor 52 then updates the record 56 to record the time at which the local operator 50 entered the zone (step 76). The local operator 50 then inspects the tablet 48 to learn what item should be picked, retrieves the item from the shelf 12, places it into the tote 44, and leaves the zone 66. Alternatively, the table 48 transmits information concerning an item to be picked to a handheld device used by the local operator 50. Ideally, the robot 18 has parked itself at a location such that the local operator 50 does not have to leave the zone 66 to retrieve the item.

The proximity sensor 62 detects the departure from the zone 66 (step 78) and updates the record 56 to reflect the time of departure (step 80). After the local operator 50 leaves the zone 66, the robot 18 then moves on to its next destination (step 82), which could be another shelf 12 or a packing station 82 for check-out.

The data collected by the tablet 48 is eventually transmitted to warehouse management server 15, FIG. 1, either in real time as it is acquired or periodically. The data thus collected provides a basis for evaluating performance of the local operator 50 as well as any other local operators that have interacted with the robot 18.

In addition to evaluating performance, data collected by tablet 48, in particular, operator identification data, can be used by warehouse management system 15 for security purposes to determine if operator 50 is an authorized operator, is authorized to operate in a particular region of the warehouse or for a particular customer. Moreover, the identification data can be used to set preferences for operator 50, such as language used by tablet 48.

All of the other robots 18, as depicted in FIG. 1, also collect data from operators 50 with which they interact and transmit the data to management server 84. This data is thus available to management to discourage an otherwise unsupervised local operator 50 from performing poorly or, conversely, to provide a basis for rewarding a local operator 50 for performing well.

The data collected by robot 18 and transmitted to warehouse management server 15 indicative of local operator activity includes information regarding one or more of the following: the amount of time for an operator to enter the zone 66 after the robot 18 arrives at a destination proximate the local operator 50, the amount of time operator 50 takes to exit zone 66 after the operator enters the zone, and the amount of time the operator 50 takes to perform a defined function, such as picking an item from shelf 12 and placing on the robot 18 or picking an item from robot 18 and placing it on shelf 12.

Warehouse management server 15 may be configured to track local operator efficiency based at least in part on the information collected indicative of local operator activity.

The management 15 server may be configured to maintain warehouse statistics based at least in part on this information. Operator efficiency and other statistics collected/computed may be may be used as an incentive to increase operator performance or in other ways by management.

Figure 6:
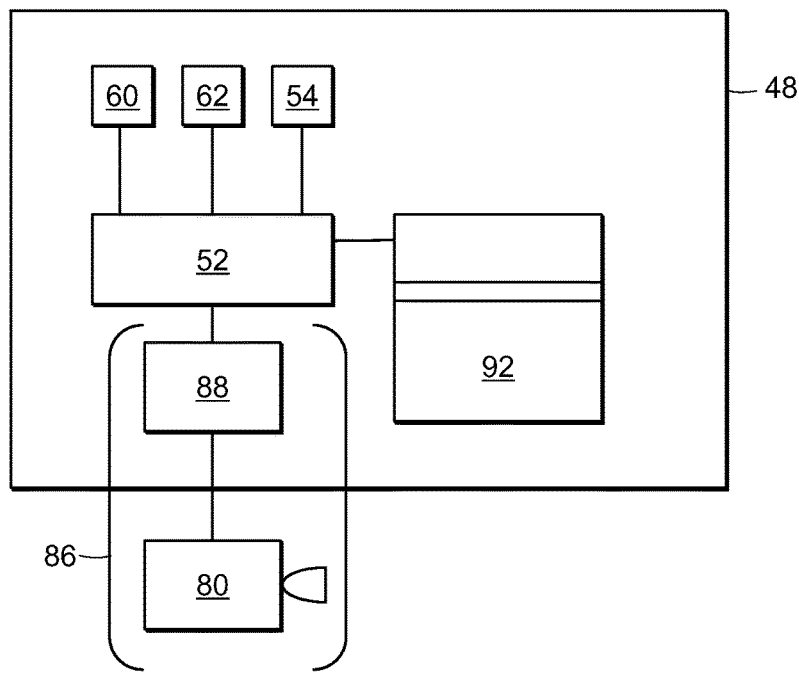
FIGS. 6 and 7 show alternative embodiments having on-board identification systems.
Figure 7:
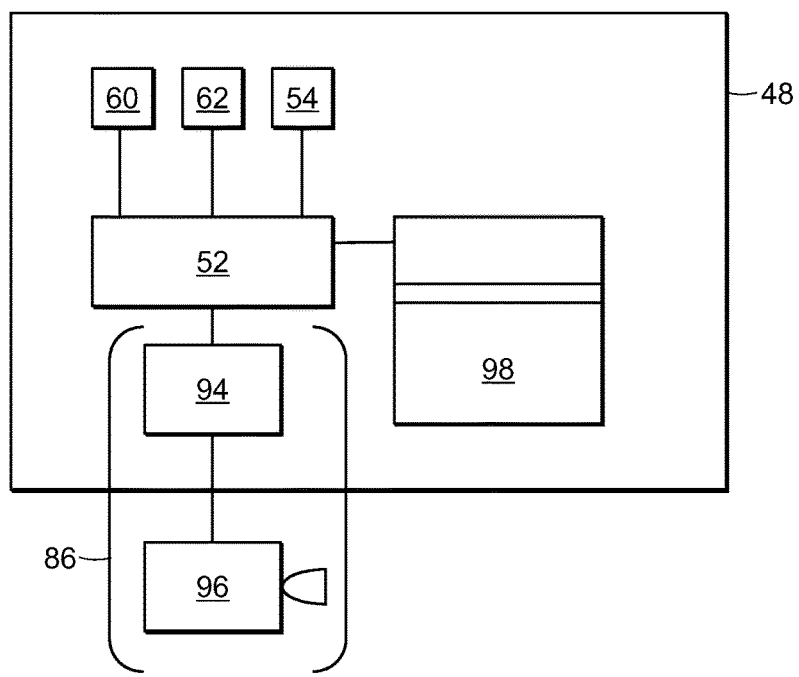

In other embodiments, shown in FIGS. 6 and 7, the local operator 50 does not carry identifying information. Instead, the tablet 48 is coupled to an on-board identification system 86. In the embodiment shown in FIG. 6, the on-board identification system 86 includes a facial-recognition system 88 that receives an image from a camera 90 and consults a facial-recognition database 92 to identify the local operator 50. In another embodiment, shown in FIG. 7, the on-board identification system 86 includes a retinal-identification system 94 that receives data from a retina scanner 96 and consults a retinal-database 98 to identify the local operator 50.

Once the robot 18 has made its rounds through the warehouse 10 and collected all items needed to fulfill an order 16, it proceeds to a packing station 100 carrying the various items. At the packing station 100, the various items are prepared for shipment.

Having described the invention, and a preferred embodiment thereof, what is claimed as new and secured by letters patent is:

1. A system for identifying and tracking performance of operators in a warehouse, the system comprising:
   At least one robot configured to interact with the operators in the warehouse, the at least one robot including:
   a first transceiver,
   a proximity detector, and
   a memory,
   wherein said first transceiver defines a zone surrounding said robot,
   wherein said proximity detector is coupled to said first transceiver,
   wherein said proximity detector is configured to detect entry, into said zone, of an operator and to detect exit of said operator from said zone,
   wherein said memory contains information identifying said operators who have entered and exited said zone; and
   wherein said at least one robot includes a network interface configured to provide information indicative of operator activity to a management server, and wherein said management server is configured to track operator efficiency based at least in part on said information indicative of operator activity.

2. The system of claim 1 further comprising a second transceiver associated with each said operator that carries information identifying said operator, wherein said second transceivers are with the operators.

3. The system of claim 2, wherein said second transceiver comprises an RFID transceiver.

4. The system of claim 1, wherein the at least one robot further comprises a contactless identification system, wherein said contactless identification system identifies said local operator without physically contacting said local operator.

5. The system of claim 4, wherein said identification system comprises a camera, and a facial-recognition system coupled to said camera, wherein said facial-recognition system identifies said local operator.

6. The system of claim 4, wherein said identification system comprises a retinal scanner and a retinal-identification system coupled to said retinal scanner, wherein said retinal-identification system identifies said local operator.

7. The system of claim 1, wherein the at least one robot further includes a tablet, wherein said tablet comprises a tablet processor and a network interface, wherein, using said network interface, said tablet provides information to a management server, said information comprising information indicative of operator activity.

8. The system of claim 1, wherein said management server is configured to provide, to said operator, an incentive that is based at least in part on said information indicative of local operator activity.

9. The system of claim 1, wherein said management server is configured to maintain warehouse statistics based at least in part on said information indicative of local operator activity.

10. The system of claim 7, wherein said tablet provides operator identification information to said management server.

11. The system of claim 10, wherein said operator identification information is used by said management server to determine if the operator is an authorized operator.

12. The system of claim 10, wherein said operator identification information is used by said management server to set operator preferences for interaction with said tablet; wherein said operator preferences include language.

13. A method for identifying and tracking performance of operators in a warehouse, said method comprising:
    causing a robot to proceed to a location;
    at said location, defining a zone around said robot;
    detecting entry of a local operator into said zone;
    without physical contact with said local operator, identifying said local operator;
    providing information indicative of local operator activity to a management server; and
    tracking local operator efficiency based at least in part on said information indicative of local operator activity.

14. The method of claim 13, further comprising detecting exit of said local operator from said zone.

15. The method of claim 13, wherein identifying said local operator comprises receiving, from a transceiver carried by said local operator, information identifying said local operator.

16. The method of claim 13, wherein identifying said local operator comprises receiving, from an RFID tag carried by said local operator, information identifying said local operator.

17. The method of claim 13, wherein identifying said local operator comprises performing identification based on data indicative of a face of said local operator.

18. The method of claim 13, wherein identifying said local operator comprises performing identification based on data indicative of a retina of said local operator.

19. The method of claim 13, wherein said information indicative of local operator activity includes information regarding one or more of the amount of time for an operator to enter the zone after the robot arrives at said location, the amount of time the operator takes to exit the zone after the operator enters the zone, the amount of time the operator takes to perform a defined function.

20. The method of claim 13, further comprising providing, to a local operator, an incentive based at least in part on said information indicative of local operator activity.

21. The method of claim 13, further comprising maintaining warehouse statistics based at least in part on said information indicative of local operator activity.

22. The method of claim 13, further comprising providing operator identification information to said management server.

23. The method of claim 22, wherein said operator identification information is used to determine if the operator is an authorized operator.

24. The method of claim 22, wherein said operator identification information is used to set operator preferences for interaction with said operator; wherein said operator preferences include language.

25. The system of claim 1, wherein said information indicative of operator activity includes information regarding one or more of the amount of time for an operator to enter the zone after the robot arrives at a destination proximate the user, the amount of time the operator takes to exit the zone after the operator enters the zone, the amount of time the operator takes to perform a defined function.

* * * * *

UNITED STATES PATENT AND TRADEMARK OFFICE
CERTIFICATE OF CORRECTION

PATENT NO. : 10,198,706 B2
APPLICATION NO. : 14/815110
DATED : February 5, 2019
INVENTOR(S) : Johnson et al.

It is certified that error appears in the above-identified patent and that said Letters Patent is hereby corrected as shown below:

On the Title Page

Item (72), should read:
Michael Charles Johnson, Ashland, MA (US);
Bradley Powers, Lowell, MA (US);
Bruce Welty, Boston, MA (US);
Sean Johnson, Danvers, MA (US);
Luis Jaquez, Burlington, MA (US)

Signed and Sealed this
Eighth Day of December, 2020

Andrei Iancu
*Director of the United States Patent and Trademark Office*